United States Patent
Efimov et al.

(10) Patent No.: US 6,965,472 B2
(45) Date of Patent: Nov. 15, 2005

(54) NONRECIPROCAL OPTICAL ELEMENT WITH INDEPENDENT CONTROL OF TRANSMISSION OPPOSITE DIRECTIONS

(75) Inventors: Oleg M. Efimov, Newbury Park, CA (US); Alexander A. Betin, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/806,717

(22) Filed: Mar. 22, 2004

(65) Prior Publication Data

US 2005/0207009 A1   Sep. 22, 2005

(51) Int. Cl.$^7$ .......................... G02B 5/30; G02B 27/28
(52) U.S. Cl. ....................... 359/484; 359/485; 359/900
(58) Field of Search ................................ 359/484, 487, 359/584, 337.21, 337.22, 338, 339, 341.1, 359/347, 485, 900; 385/11, 18, 24, 37; 398/87

(56) References Cited

U.S. PATENT DOCUMENTS

| | | | |
|---|---|---|---|
| 3,700,309 A | * | 10/1972 | Skolnick et al. ............. 359/577 |
| 4,194,168 A | | 3/1980 | Jarrett et al. |
| 4,195,908 A | | 4/1980 | Kestigian et al. |
| 4,219,275 A | | 8/1980 | Henry |
| 5,162,944 A | * | 11/1992 | Yamamoto et al. .......... 359/247 |
| 5,295,016 A | * | 3/1994 | Van Deventer .............. 359/347 |
| 5,303,314 A | * | 4/1994 | Duling et al. .................. 385/11 |
| 5,400,418 A | * | 3/1995 | Pearson et al. ............... 385/11 |
| 5,729,380 A | | 3/1998 | Betin et al. |
| 5,867,306 A | * | 2/1999 | Isshiki ....................... 359/337.1 |
| 5,887,091 A | * | 3/1999 | Jabr et al. ...................... 385/24 |
| 6,055,081 A | * | 4/2000 | Koyano et al. .............. 398/147 |

(Continued)

FOREIGN PATENT DOCUMENTS

JP   046324368 A   * 11/1994

(Continued)

OTHER PUBLICATIONS

A. A. Betin, S. C. Matthews, and M. S. Mangir, "Phase Conjugation of Depolarized Light with a Lc Loop PC", Nonlinear Optics: Materials, Fundamentals, and Applications Conference, Kauai, Hawai Jul. 1998; pp. 288-290.

(Continued)

*Primary Examiner*—Ricky D. Shafer
(74) *Attorney, Agent, or Firm*—John E. Gunther; Leonard A. Alkov; Karl A. Vick

(57) ABSTRACT

A nonreciprocal optical element and method for operating it to effect separate control of intensity and phase (or optical path length) of counter propagating beams over a very wide range. The nonreciprocal optical element includes a circulator for routing a first signal from a first port to a second port and a second signal from the second port to a third port, a third signal from the third port to a fourth port and a fourth signal from the fourth port to the first port; a first mirror for reflecting a signal output by the second port back into the second port; and second mirror for reflecting a signal output by the fourth port back into the fourth port. Polarization rotation elements such as quarter-wave plates are disposed between the mirrors and the second and fourth ports to preserve the polarization of the input beams. Filters are disposed between these ports and mirrors to adjust the transmittance of the input and output signals. An arrangement is included for translating the positions of the mirrors relative to the ports to adjust the phase of the output signals. Independent spectral control is effected by providing a Bragg grating, interference filter or other spectral filter between the second or fourth ports and the mirror associated therewith.

12 Claims, 3 Drawing Sheets

U.S. PATENT DOCUMENTS

| | | | |
|---|---|---|---|
| 6,175,444 B1 * | 1/2001 | Toyohara | 359/341.2 |
| 6,233,090 B1 * | 5/2001 | Fukaishi | 359/337 |
| 6,278,547 B1 | 8/2001 | Betin | |
| 6,381,069 B1 * | 4/2002 | Riant et al. | 359/569 |
| 6,407,861 B1 * | 6/2002 | Zhang et al. | 359/484 |
| 6,538,815 B1 * | 3/2003 | Cao | 359/484 |
| 6,594,410 B2 * | 7/2003 | Kersey et al. | 385/15 |
| 6,693,743 B2 * | 2/2004 | Zhao | 359/495 |
| 6,731,836 B2 * | 5/2004 | Takahashi et al. | 385/24 |

FOREIGN PATENT DOCUMENTS

| JP | 09018417 A | * | 1/1997 |
|---|---|---|---|
| WO | WO 99/62202 | * | 12/1999 |

OTHER PUBLICATIONS

G. E. Lano and C. Pinyan "Optical isolators direct light the right way," Laser Focus World, Jul. 1995, p.125 to 127.

J. Poison et al "Internal reflections of the Gaussian beams in Faraday isolators," Applied Optics, Jun. 1997, vol. 36, No. 18, p.4123 to 4130.

"Optical fiber amplifiers: materials, devices, and applications," S. Sudo, editor, Artech House Inc., 1999; p. 420.

* cited by examiner

NONRECIPROCAL OPTICAL ELEMENT WITH INDEPENDENT CONTROL OF TRANSMISSION OPPOSITE DIRECTIONS

BACKGROUND OF THE INVENTION

1. Field of the Invention

The present invention relates to optical systems. More specifically, the present invention relates to nonreciprocal optical elements.

2. Description of the Related Art

Nonreciprocal optical elements (NOEs) are optical devices with different conditions of beam propagation in opposite directions. They are necessary components for applications in many areas, e.g. 1) in special optical schemes for controlling the parameters of counter directional beams; 2) in ring lasers to excite a unidirectional oscillation in a predetermined direction; 3) in laser gyroscopes to exclude frequency capture of the counter directional waves; and 4) in fiber optical gyroscopes to initialize the phase shift between the counter directional waves. See the following references, the teachings of which are hereby incorporated herein by reference:

1. A. A. Betin, S. C. Matthews, and M. S. Mangir, "Phase Conjugation of Depolarized Light with a Loop PC", Nonlinear Optics: Materials, Fundamentals, and Applications Conference, Kauai, Hi., July 1998.
2. A. A. Betin and M. S. Mangir, "Loop Phase-Conjugate Mirror for Depolarized Beams," U.S. Pat. No. 5,729,380; assigned to Hughes Electronics, March 1998.
3. S. M. Jarrett, M. W. Leitner. "Unidirectional ring laser apparatus and method," U.S. Pat. No. 4,194,168; assigned to Spectra Physics, March 1980.
4. M. Kestigian, R. Mcclure, E. Vaher, "Magnetic mirror for imparting non-reciprocal phase shift," U.S. Pat. No. 4,195,908; assigned to Sperry Corp., April 1980.
5. R. D. Henry, "Ring laser having magnetic isolation of counter-propagating light waves," U.S. Pat. No. 4,219,275; assigned to Rockwell International Corp., August 1980.
6. Copending U.S. patent application Ser. No. 10/860,468, filed Jun. 2, 2004 by A. A. Betin and O. M. Efimov entitled "Wavelength Self-Adjusted Outcoupler and Method".
7. Copending U.S. patent application Ser. No. 10/761,720, filed Jan. 20, 2004 by A. A. Betin and O. M. Efimov entitled "Wide-angle polarization-independent narrow-band spectral filter and method".
8. G. E. Lano and C. Pinyan "Optical isolators direct light the right way," Laser Focus World, July 1995, p. 125.
9. J. Poirson et al "Internal reflections of the Gaussian beams in Faraday isolators," Applied Optics, June 1997, Vol. 36, No. 18, p. 4123.
10. A. A. Betin. "Polarization insensitive Faraday attenuator," U.S. Pat. No. 6,278,547;
11. "Optical fiber amplifiers: materials, devices, and applications," S. Sudo, editor, Artech House Inc., 1999.

NOEs like nonreciprocal mirrors introducing differential phase shifts between counter propagating beams are usually used in laser gyroscopes to exclude frequency capture of the counter directional waves. The basic disadvantages of these elements are the restricted available phase shift and the inability of independent/separate adjustment of the wavelength and intensity of each beam.

Another NOE—the Faraday isolator—is usually used in ring lasers and in loop phase conjugate mirrors (PCM). However, the Faraday isolator used for unidirectional oscillation of laser may be imperfect, lossy and change the intensity of the beam transmitted in one of the opposite directions just enough to suppress the laser oscillation in this direction. The further improvements of the Faraday isolators result in their wide application including utilization in the loop PCMs.

As a rule, in conventional NOEs a change of the propagation conditions for one beam results in a change of the conditions for the counter-propagating beam. However, independent/separate control of beams' parameters is very desirable in many cases. Hence, a need remains in the art for a system and method for providing independent control of beams propagating in opposite directions in nonreciprocal optical elements.

SUMMARY OF THE INVENTION

The present invention addresses the need in the art by providing a nonreciprocal optical element and method for operating it to effect separate control of intensity and phase (or optical path length) of counter propagating beams over a very wide range. The inventive nonreciprocal optical element includes a circulator arrangement for routing a first signal from a first port to a second port and a second signal from the second port to a third port, a third signal from the third port to a fourth port and a fourth signal from the fourth port to the first port; a first reflective element for reflecting a signal output by the second port back into the second port; and second reflective element for reflecting a signal output by the fourth port back into the fourth port.

In a specific implementation, the circulator arrangement is a circulator and the reflective elements are mirrors. Polarization rotation elements such as quarter-wave plates may be disposed between the mirrors and the second and fourth ports to preserve the polarization of the input beams. Further, filters may be disposed between these ports and mirrors to adjust the transmittance of the input and output signals. An arrangement is taught for translating the positions of the mirrors relative to the ports to adjust the phase of the output signals. Independent spectral control is effected by providing a Bragg grating, interference filter or other spectral filter between the second or fourth ports and the mirror associated therewith.

Thus, the invention provides a nonreciprocal optical element with separate control of signals transmitted in opposite directions therethrough. In addition, the present invention allows independent phase shift control of transmitted beams over a wide region in that the optical path length of the beams propagated in opposite directions can be varied independently.

BRIEF DESCRIPTION OF THE DRAWINGS

FIG. 3b is a schematic representation of the standard circulator of FIG. 3a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is described herein with respect to an illustrative application in a loop phase conjugate mirror (PCM).

Figure 1:
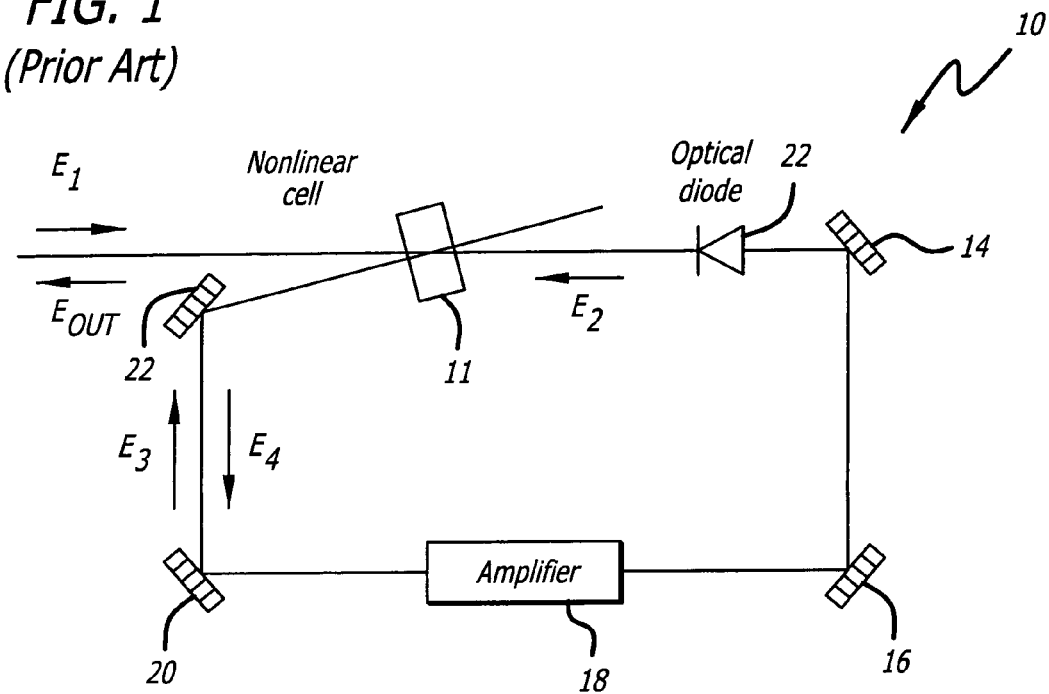
FIG. 1 shows an optical schematic of a loop PCM implemented in accordance with conventional teachings.

FIG. 1 shows an optical schematic of a loop PCM 10 implemented in accordance with conventional teachings. An input beam from an amplifier beamline (denoted $E_1$) enters a nonlinear medium 11 from the left and traverses the loop in a clockwise direction. An optical diode 12 is used to prevent saturation of a gain medium (amplifier) 18 in this direction. The optical diode is typically implemented with a Faraday rotator. The clockwise beam ($E_3$) is directed back into the nonlinear medium 11 by mirrors 14, 16, 20 and 22, where it interferes with the input beam ($E_1$) and writes real-time holographic gratings in the medium 11. The grating serves as a holographic resonator mirror, which allows a laser mode ($E_2$) to build from noise in the preferred counterclockwise direction around the loop only. A portion of this beam ($E_{OUT}$) is coupled out of the PCM 10 through the grating in the nonlinear medium, in the opposite direction to the input beam.

Under the proper conditions, the dynamic grating is set up such that the output beam is a phase conjugate replica of the input beam. Using this basic architecture in a vector (or polarization-correcting) configuration, near-diffraction limited restoration of completely depolarized beam may be achieved with optical aberration and birefringence correction.

To control the intensity of the counter directional waves in a loop PCM, an imperfectly adjusted (leaky) Faraday isolator can be used. To satisfy the proper operation conditions in the loop PCM, it is desirable to adjust the transmittance of this isolator in the clockwise direction only, thus conserving the transmittance in the opposite direction at close to 100%. Since standard Faraday isolators do not allow unidirectional control of beam intensity, an improved Faraday attenuator was proposed for the loop PCM. See the above-referenced U.S. Pat. No. 6,278,547 filed Aug. 21, 2001 by A. A. Betin and entitled POLARIZATION INSENSITIVE FARADAY ATTENUATOR, the teachings of which have been incorporated herein by reference. This attenuator can have a definite, prior specified, transmittance $\tau$ in one direction and a transmittance of close to 100% in the opposite direction. However, it is difficult to fabricate an adjustable Faraday attenuator, thus to make it capable for real-time control of transmittance $\tau$ at the time of experiment, i.e. in order to change a value of $\tau$ it is necessary to replace the attenuator as a whole. Moreover, any optical diodes including Faraday attenuators cannot have different spectral transmissions for the counter propagating beams and provide a wavelength shift in the loop PCM.

Nevertheless, the possibility of wavelength control in the loop PCM is a very useful option for phase conjugate laser architectures. Therefore, in copending U.S. patent application Ser. No. 10/860,468, filed Jun. 2, 2004 by A. A. Betin and O. M. Efimov entitled "Outcoupler With Bragg Grating and System and Method Using Same," the teachings of which have been incorporated herein by reference, Betin et al. proposed to use the thick Bragg gratings for a wavelength shift in the loop PCM. This arrangement is shown in FIG. 2.

Figure 2:
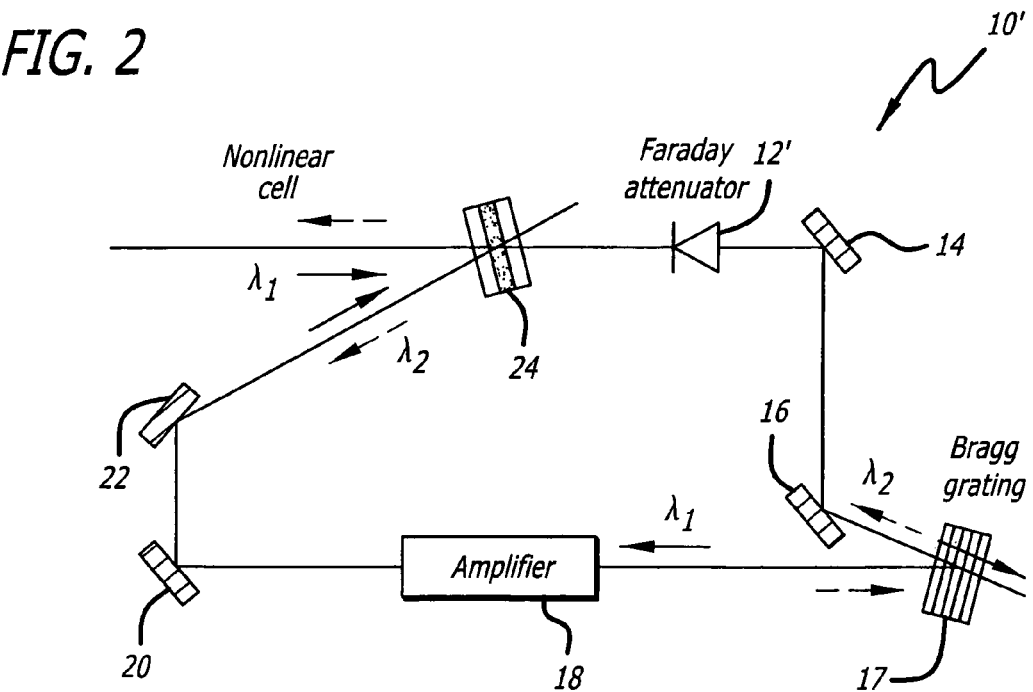
FIG. 2 shows an optical schematic of a loop PCM implemented with a Bragg grating.

FIG. 2 shows an optical schematic of a loop PCM 10' implemented with a Bragg grating in accordance with the teachings of copending U.S. patent application Ser. No. 10/860,468, filed Jun. 2, 2004 by A. A. Betin and O. M. Efimov entitled "Outcoupler With Bragg Grating and System and Method Using Same," the teachings of which have been incorporated herein by reference. In this arrangement, a Bragg grating is added between the second fold mirror 16 and the amplifier 18.

In copending U.S. patent application Ser. No. 10/761,720, filed Jan. 20, 2004 by A. A. Betin and O. M. Efimov entitled "Wide-angle polarization-independent narrow-band spectral filter and method," another optical scheme is disclosed which offers an improved wide-angle narrow-band spectral filter for achieving a wavelength shift. In both cases, a Bragg grating is disclosed as a narrow-band reflector in place of one of the mirrors in the loop PCM. To suppress an oscillation at a shifted wavelength in the clockwise direction, a Faraday attenuator 12' is used. Thus, a Bragg grating in combination with the laser amplifier and Faraday attenuator could provide a some oscillation in the required direction at a shifted wavelength $\lambda_2$ and suppress an oscillation at the input wavelength $\lambda_1$.

However, one more condition for proper operation of a loop PCM is that the lengths of the optical paths in both directions need to be close (preferably equal) to each other for good compensation of beam distortions. Unfortunately, the above-mentioned applications by Betin et al. may not exactly satisfy this condition because the reflection of thick Bragg gratings is distributed along a sample thickness having some physical depth. That is, the reflection occurs from some effective-plane inside the Bragg grating. Therefore, if the reflections of counter-directional beams occur from different gratings or from a grating and any surface as was proposed in the copending applications, the optical paths may be different and this may limit the compensation of beam distortions. This may be a disadvantage of using a thick Bragg grating and a Faraday attenuator.

The present invention addresses the above-mentioned issues when it is used in phase conjugate master oscillator/power amplifier (PC MOPA) arrangements, with a loop-type vector phase conjugate mirror. The proposed NOE can be used as a separate optical element and is essential for many applications in addition to PC MOPA based laser systems.

The inventive NOE utilizes a circulator—with two reflective elements, e.g., standard mirrors, reflective Bragg gratings, mirrors based on multilayer optical coatings, etc., for separate control of spectrum and transmission for counter propagating beams. In addition, a beam phase shift or optical length can easily be varied over a wide range in both directions. Finally, this element can operate with unpolarized beams if it is necessary.

Figure 3A:
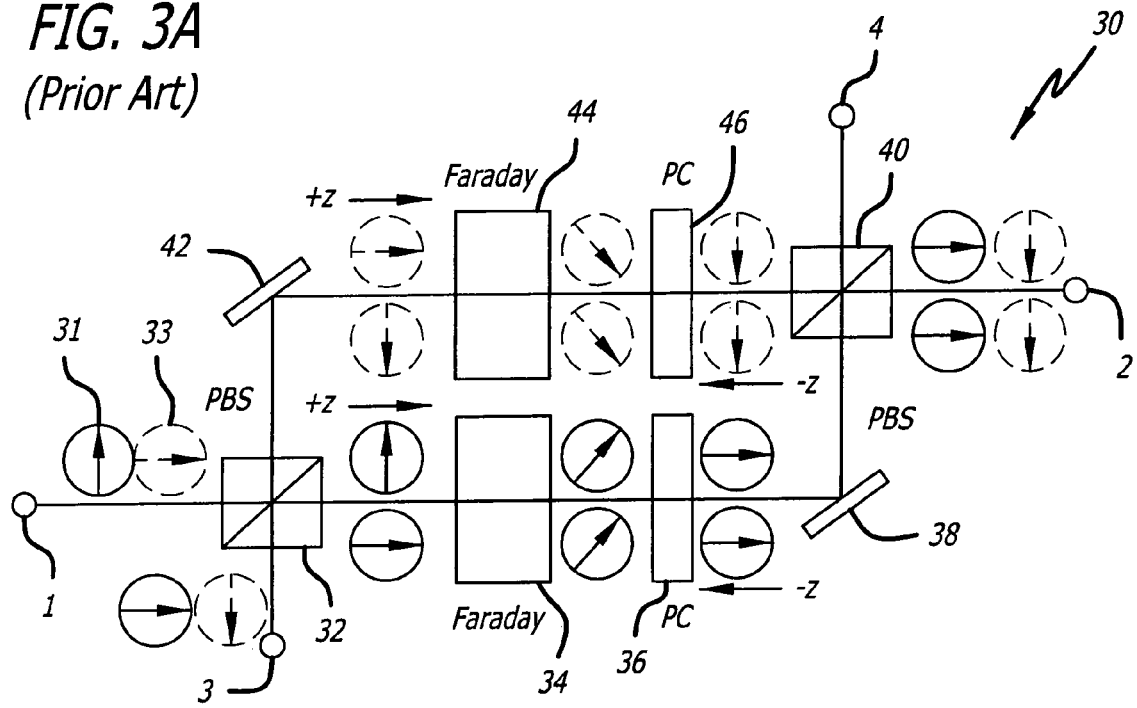
FIG. 3a is a diagram that illustrates the operation of a standard circulator.
Figure 3B:
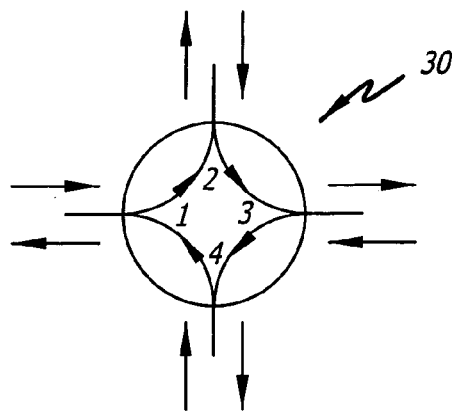

FIG. 3a is a diagram that illustrates the operation of a standard circulator 30. FIG. 3b is a schematic representation of the standard circulator of FIG. 3a. An unpolarized beam enters port #1 is split into two perpendicularly polarized beams with a polarization beam splitter (PBS) 32. The polarizations of the two beams are rotated by 90°, after sequentially passing through Faraday rotators 34 or 44 and a polarization compensator (PC) 36 or 46. The Faraday rotator and polarization compensator combination functions in such a way that it rotates the plane of polarization of the input polarized beam by 90°, but conserves polarization on the return path. The beams are then combined after going through a second PBS 40 and exit at port #2. On the return path (assuming the beams are reflected back at port #2), the polarizations of the split beams are conserved. Therefore, a beam that enters port #2 exits through port #3. Analogously, a beam passes around the circulator in the cyclical sequence #1–#2–#3–#4–#1. See "Optical Fiber Amplifiers: Materials, Devices, and Applications," S. Sudo, editor, Artech House Inc., 1999. Hereinafter the schematic representation of a circulator shown in FIG. 3b will be used.

Figure 4:
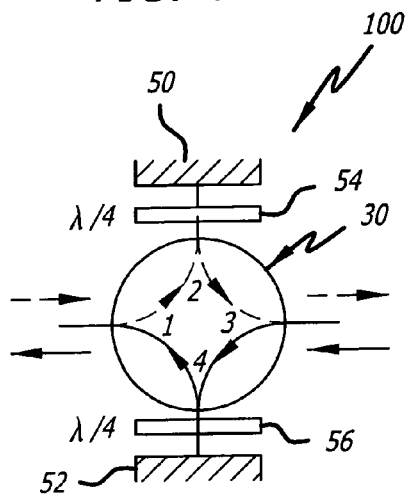
FIG. 4 is an optical schematic of a nonreciprocal optical element implemented in accordance with an illustrative embodiment of the present teachings.

FIG. 4 is an optical schematic of a nonreciprocal optical element 100 implemented in accordance with an illustrative embodiment of the present teachings. In accordance with the present teachings and as shown in FIG. 4, first and second mirrors 50 and 52 are mounted to reflect a beam exiting ports #2 and #4 respectively. One can see that in this case, a beam that enters port #1 exits through port #3, each time bypassing port #2. Conversely, in the opposite direction, a beam that enters port #3 exits through port #1, each time bypassing port #4. This means that the first mirror 50 defines the transmittance of the element in the forward direction while the second mirror 52 defines the transmittance in the opposite direction. Further, one can see from FIG. 3a that each polarization component of the input beam is rotated by 90° after passing the ports #1–#2–#3 or #3–#4–#1. To conserve the polarization of beam components, quarter-wave plates 54 and 56 can be installed in each beam as shown in FIG. 4. This design provides 90° polarization rotations of beams which have double-passed the quarter-wave plates and total restoration of the output beam polarization relative to the input beam polarization. One more advantage of this solution is that each beam component propagates through both shoulders of the circulator. Therefore, the optical paths within a circulator for both polarizations will be exactly equal to each other. This ensures proper phase conditions for the polarization components independent of any possible difference in the optical paths of the circulator shoulders.

Figure 5:
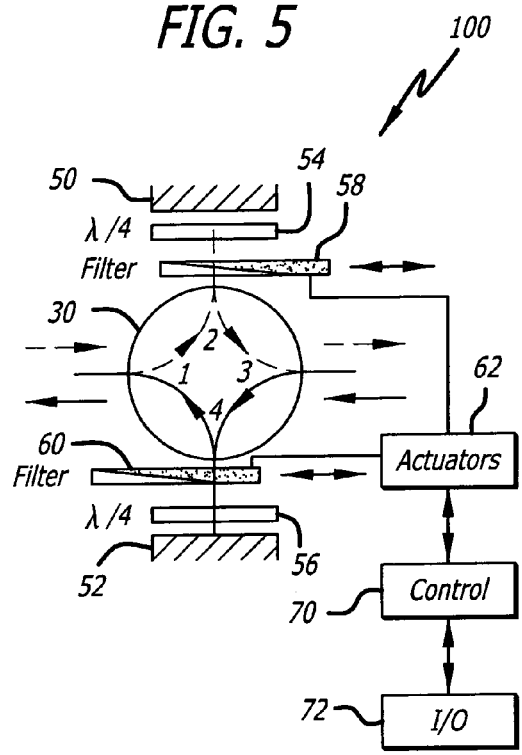
FIG. 5 is a schematic diagram of the inventive NOE with filters added to effect adjustable transmittance.

FIG. 5 is a schematic diagram of the inventive NOE with filters added to effect adjustable transmittance. Accurate and separate adjustment of the device transmittance in any direction is achieved by changing the reflection coefficients of mirrors 50 and 52. The reflection coefficients may be changed by inserting adjustable filters 56 and 58 between the mirrors 50 and 52, respectively, and the circulator 30. The filters may be implemented with linear or circular variable filters via actuators 62 in response to a control system 70 and user input provided via an I/O interface 72. The control system may be a general-purpose microprocessor, digital logic or other suitable arrangement. This arrangement makes it possible to modify the intensity of the beams in real time. This offers a particular benefit in the loop PCM 100 when the intensity of a signal passed the loop in the clockwise direction should be equal approximately to the input signal. Therefore, any changes in the gain of the amplifier results in the necessity of modifying the transmittance of the optical diode (FIG. 1) or of another NOE.

Figure 6:
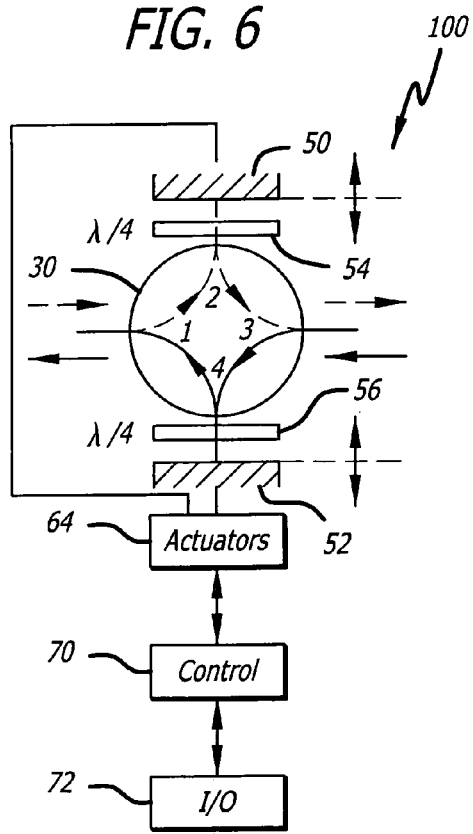
FIG. 6 is a schematic diagram of the inventive NOE with an arrangement for effecting an adjustable phase shift of transmitted beams in accordance with an illustrative embodiment of the present teachings.

FIG. 6 is a schematic diagram of the inventive NOE with an arrangement for effecting an adjustable phase shift of transmitted beams in accordance with an illustrative embodiment of the present teachings. In this embodiment, the first and second mirrors 50 and 52 are mounted for translational motion relative to the circulator 30. Actuators 64 move the mirrors relative to the circulator 30 in response to signals from the controller 70. Hence, separate arbitrary phase shift or variation of the optical lengths of counter propagating beams is effected by precise translation of one or both mirrors along the optical axes. This arrangement facilitates a setting of equal lengths of the optical paths in the loop PCM in both directions for good compensation of the beam distortions.

Figure 7:
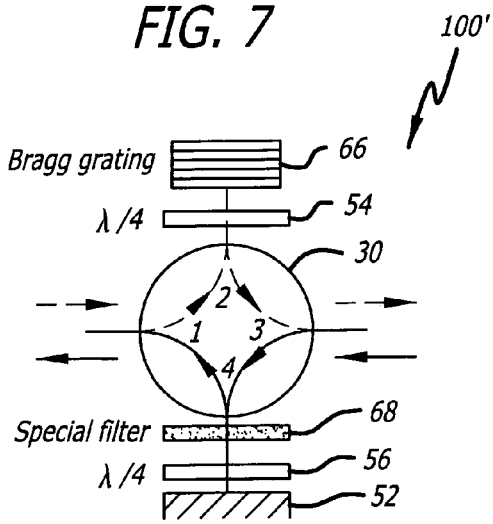
FIG. 7 shows an alternative embodiment in which independent spectral control of transmission in each direction is effected by use of spectral filters.

FIG. 7 shows an alternative embodiment 100' in which independent spectral control of transmission in each direction is effected by use of spectral filters. In FIG. 7, the mirror 50 is replaced with a Bragg grating 66 and/or a spectral filter, such as an interference filter 68 is inserted between the second mirror 52 and the circulator 30. If a small wavelength shift between the counter propagating beams has to be provided, as in the case of a loop PCM, narrow-band reflectors like thick Bragg gratings or interference filters can be used as shown in FIG. 7. The placement of these reflectors perpendicular to the optical axes yields an additional benefit in that the reflectors will operate over wide angles of reflection and symmetrically relative to the optical axes.

Thus, the proposed invention allows easy and separate control of all the basic optical parameters of counter propagating beams: intensity, spectrum, and phase shift or optical length over a very wide range of variations.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A nonreciprocal optical element comprising:
circulator means for routing a first signal from a first port to a second port and a second signal from the second port to a third port; a third signal from the third port to a fourth port and a fourth signal from the fourth port to the first port;
first reflective means for reflecting a signal output by the second port back into the second port;
second reflective means for reflecting a signal output by the fourth port back into the fourth port;
first control means for adjusting the phase of the signal output from the second port by adjusting the position of the first reflective means relative to the second port;
second control means, independent of said first control means for adjusting the phase of the signal output from the fourth port by adjusting the position of the second reflective means relative to the fourth port; and
a first polarization rotation element between the second port and the first reflective means.

2. The invention of claim 1 wherein the circulator means includes a circulator.

3. The invention of claim 1 wherein the reflective means is mirrors.

4. The invention of claim 1 further including a second polarization rotation element between the fourth port and the second reflective means.

5. The invention of claim 4 wherein the polarization rotation elements are quarter-wave plates.

6. The invention of claim 1 wherein said control means includes means for controlling said signal output by said second port or said fourth port in real time.

7. A nonreciprocal optical element comprising:
- a circulator having first, second, third and fourth ports, the first port being a first input/output port of the nonreciprocal optical element and the third port being a second input/output port of the nonreciprocal optical element;
- a first mirror disposed to reflect a signal output by the second port back into the second port;
- a second mirror disposed to reflect a signal output by the fourth port back into the fourth port;
- means for adjusting the phase of the signal output from the second port by adjusting the position of said first mirror relative to said second port;
- means for adjusting the phase of the signal output from the fourth port by adjusting the position of said second mirror relative to said fourth port; and
- a first polarization rotation element between the second port and the first mirror.

8. The invention of claim 7 further including a second polarization rotation element between the fourth port and the second mirror.

9. The invention of claim 8 wherein the polarization rotation elements are quarter-wave plates.

10. The invention of claim 7 wherein said control means includes means for controlling said signal output by said second-port or said fourth port in real time.

11. A method for transmitting first and second signals in opposite directions through a nonreciprocal optical device and effecting independent control thereof including the steps of:
- routing a first signal from a first port to a second port and a second signal from the second port to a third port, a third signal from the third port to a fourth port and a fourth signal from the fourth port to the first port;
- reflecting a signal output by the second port back into the second port;
- reflecting a signal output by the fourth port back into the fourth port;
- rotating a polarization state of the signal output by the second port;
- adjusting the phase of the signal output from the second port by translating a reflective element relative to the second port; and
- adjusting the phase of the signal output from the fourth port by translating a reflective element relative to the fourth port.

12. The invention of claim 11 further including the step of controlling said signal output by said second port or said fourth port in real time.

* * * * *